R. KECK.
DRIVING MECHANISM FOR VEHICLES.
APPLICATION FILED JULY 23, 1918.
1,435,162.
Patented Nov. 14, 1922.
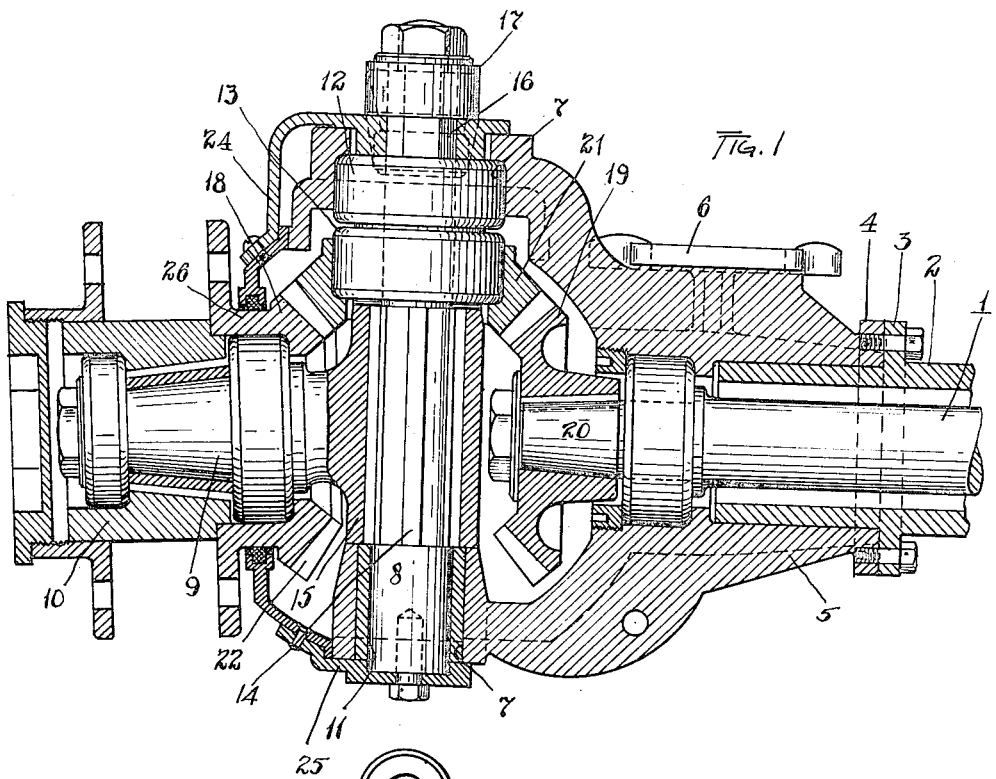
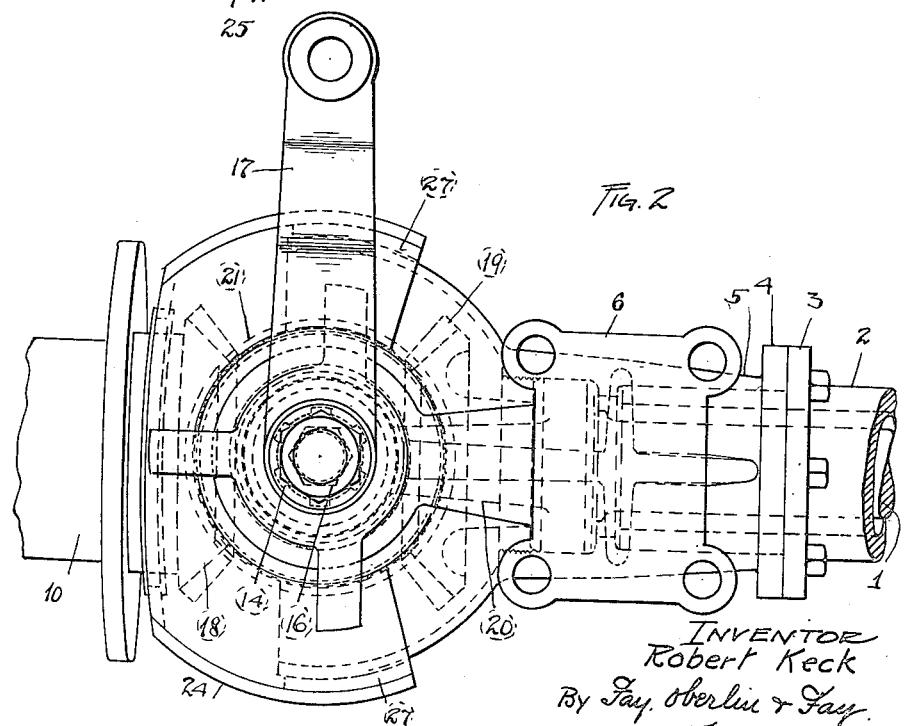
INVENTOR
Robert Keck
By Fay, Oberlin & Fay
ATTORNEYS Patented Nov. 14, 1922.

1,435,162

UNITED STATES PATENT OFFICE.

ROBERT KECK, OF CHICAGO, ILLINOIS, ASSIGNOR TO THE DOUBLE-DRIVE TRUCK COMPANY, OF CHICAGO, ILLINOIS, A CORPORATION OF SOUTH DAKOTA.

DRIVING MECHANISM FOR VEHICLES.

Application filed July 23, 1918. Serial No. 246,283.

*To all whom it may concern:*

Be it known that I, ROBERT KECK, a citizen of the United States, and a resident of Chicago, county of Cook, and State of Illinois, have invented a new and useful Improvement in Driving Mechanism for Vehicles, of which the following is a specification, the principle of the invention being herein explained and the best mode in which I have contemplated applying that principle, so as to distinguish it from other inventions.

The present invention, relating, as indicated to combined driving and steering means for vehicles, is particularly adapted for what are commonly termed four-wheel drive trucks, in which both front and rear wheels of the vehicle are driven from the engine, and in which either of four wheels are steered or only the front wheels, as desired. It is common in this type of vehicles to transmit the drive from the axle shafts to the wheels by means of universal joints interposed therebetween, with the objection that power is lost whenever the wheel spindles are not in line with the axles, and with the further objection that if the wheels are canted slightly outward, as is desirable to bring the plane of each wheel perpendicular to the surface of the road, there is always a slight angularity between the wheel and the driving axle, even when the wheels are parallel with the direction of movement of the vehicle. This results in continuous loss of power to the wheels, and also in a considerable amount of wear on the universal joints used, causing them to be replaced at frequent intervals.

The present invention is directed to the provision of an improved driving and steering mechanism for this use, in which the loss of power shall be reduced to a minimum, and which shall be extremely simple in construction and in its operation, while permitting the complete enclosure of the parts used for this purpose. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawings:—

Fig. 1 is a longitudinal vertical section through my improved driving and steering mechanism, showing the same in position on an axle; and Fig. 2 is a plan view of the same.

In Fig. 1 I have shown a shaft or axle 1 which may represent either the front or rear axle of the vehicle, and which in enclosed in the usual axle housing or tube 2, which, in this instance, is provided with an outwardly extending annular flange 3 a short distance from the outer end of the tube, to which is removably fastened, by means of a flange 4, an enclosing yoke 5. This yoke 5 is constructed to carry a spring seat 6 and extends beyond the axle 1 and the axle housing 2, and is there provided with vertically aligned openings 7 in which is mounted a shaft 8 adapted to carry a wheel spindle 9 and wheel 10. The shaft 8 is carried in a plain bearing 11 at its lower end, and in two vertically aligned anti-friction thrust bearings 12 and 13 at its upper end, each of these bearings being of the type which will support a load both axially and radially, and thus serve both as the ordinary anti-friction ball bearings and also as thrust bearings. Between the portions of the shaft 8, which are inserted in these bearings 11, 12 and 13, the shaft is formed with a series of longitudinally extending splines 14, and is in this way keyed to a vertically extending portion 15 of the wheel spindle, which is of course formed to snugly fit over the shaft 8 and to be slidable but non-rotatable thereon.

The upper portion 16 of the shaft 8 is of polygonal form, being here shown as hexagonal, and upon it is mounted a rod or link 17, which extends rearwardly from the axle and is intended to be attached to the steering mechanism, as rotation of this rod 17 rotates the shaft 8, and with it the tubular shaft 15 and wheel spindle 9, the steering being effected in this manner.

Mounted upon the wheel and wheel spindle 9 is a bevel gear 18 and a similar but oppositely faced bevel gear 19 is keyed to the extending end 20 of the axle shaft 1. Engaged with these two bevel gears 18 and 19 is a third bevel gear 21, which is freely and rotatably mounted against the outer face of a thrust bearing 13, and is hence not secured to or rotatable with either the shaft 8 or the tubular shaft 15.

The axis of the shafts 8 and 15 is vertical, but the central plane of the wheel spindle 9 and wheel 10 is inclined slightly from the vertical, the upper portion of the wheel and spindle being tilted outwardly away from the driving axle. To compensate for this inclination of the wheel the bevel gear 18 is formed with its teeth 22 cut deeper at the radially outer portion than at the inner portion, which allows these teeth to mesh with the teeth on the bevel gear 21 as fully as though a standard bevel gear were used and were placed in a vertical plane.

The operation of my improved axle is clearly apparent from the foregoing description, the shaft 1 driving the wheel spindle 9 at all times through the constant mesh bevel gears 19, 21 and 18, irrespective of the angularity between the shaft 1 and the spindle 9. The wheel 10 may be steered by rocking the rod 17 either to the right or to the left as it is shown in Fig. 2, which will turn the wheel inwardly and outwardly, respectively, and will permit of the continuous engagement and operation of the bevel gears at all times.

Attached to the upper and lower portions of the yoke 5 are two semi-spherical enclosing casings 24 and 25 respectively, which have a lubricant-tight joint around the longitudinally extending collar 26 between the wheel and the bevel gear 18. These semi-spherical enclosing casings overlap each other as shown in Fig. 2, and are provided with an oil-tight joint therebetween, consisting of packing in the form of a felt washer 27. In this way the driving and steering mechanism interposed between the wheel and the axle may be entirely enclosed and may be run in lubricant, and this feature, together with the disposition of the anti-friction thrust bearings 12 and 13, provides a driving and steering mechanism having an extremely small amount of friction, and one that has been found to require very little attention or repair.

Other modes of applying the principle of my invention may be employed instead of the one explained, change being made as regards the mechanism herein disclosed, provided the means stated in the claim or the equivalent of such stated means be employed.

I therefore particularly point out and distinctly claim as my invention:—

In a mechanism of the class described, the combination of an axle shaft, a pivotally mounted member at right angles to said shaft and adjacent to one end thereof, a wheel spindle mounted on said member on the side opposite to said shaft but slightly out of alignment therewith, a wheel rotatably mounted on said spindle, a bevel gear rotatably mounted on said member, a second bevel gear mounted on said axle shaft, and an irregular bevel gear mounted on said wheel and meshing with said bevel gear on said member, said irregular bevel gear having its teeth cut deeper at the radially outer portion than at the inner portion.

Signed by me, this 17 day of July, 1918.

ROBERT KECK.